United States Patent
Casagrande

(10) Patent No.: US 10,723,276 B2
(45) Date of Patent: Jul. 28, 2020

(54) VACUUM MOUNTED CARRIER FOR A VEHICLE

(71) Applicant: Charles L. Casagrande, Bradenton, FL (US)

(72) Inventor: Charles L. Casagrande, Bradenton, FL (US)

( * ) Notice: Subject to any disclaimer, the term of this patent is extended or adjusted under 35 U.S.C. 154(b) by 0 days.

(21) Appl. No.: 15/760,571

(22) PCT Filed: Sep. 15, 2016

(86) PCT No.: PCT/US2016/051975
§ 371 (c)(1),
(2) Date: Mar. 15, 2018

(87) PCT Pub. No.: WO2017/048981
PCT Pub. Date: Mar. 23, 2017

(65) Prior Publication Data
US 2018/0251076 A1   Sep. 6, 2018

Related U.S. Application Data

(60) Provisional application No. 62/218,940, filed on Sep. 15, 2015.

(51) Int. Cl.
| | |
|---|---|
| *B60R 9/08* | (2006.01) |
| *B60R 9/00* | (2006.01) |
| *B60R 9/10* | (2006.01) |
| *B60R 11/00* | (2006.01) |
| *F16B 47/00* | (2006.01) |
| *F16B 1/00* | (2006.01) |

(Continued)

(52) U.S. Cl.
CPC .................. *B60R 9/00* (2013.01); *B60R 9/08* (2013.01); *B60R 9/10* (2013.01); *B60R 11/00* (2013.01); *B62H 3/00* (2013.01); *B62H 3/06* (2013.01); *F16B 1/0071* (2013.01); *F16B 47/00* (2013.01); *B60R 2011/004* (2013.01); *B60R 2011/0056* (2013.01); *B60R 2011/0071* (2013.01)

(58) Field of Classification Search
CPC ..... B60R 9/08; B60R 2011/0056; B60R 9/10; B60R 9/06; B60R 9/048; Y10S 224/924
USPC .................................................. 224/924, 559
See application file for complete search history.

(56) References Cited

U.S. PATENT DOCUMENTS

| | | | | | |
|---|---|---|---|---|---|
| 5,292,045 | A | * | 3/1994 | Mandel | ..................... B60R 9/00 224/309 |
| 5,588,661 | A | * | 12/1996 | Wolfe | ..................... B62H 1/12 211/20 |

(Continued)

OTHER PUBLICATIONS

International Search Report for corresponding PCT/US2016/051975 dated Jan. 13, 2017.

(Continued)

*Primary Examiner* — Adam J Waggenspack
(74) *Attorney, Agent, or Firm* — Sandberg Phoenix & von Gontard P.C.

(57) ABSTRACT

A carrier system for a vehicle having a pair of vacuum devices shaped and sized to mate and secure to a recreational article. Each vacuum device includes a pad shaped and sized to detachably seat with a vehicle to form a vacuum cavity. The frame is configured to detachably attach to a mounting surface, is generally arcuate, and has a front frame pivotally connected to a rear frame member to pivot between operating and storage positions.

12 Claims, 11 Drawing Sheets

(51) Int. Cl.
*B62H 3/00* (2006.01)
*B62H 3/06* (2006.01)

(56) References Cited

U.S. PATENT DOCUMENTS

| | | | |
|---|---|---|---|
| 6,167,735 B1 * | 1/2001 | Brown | B60R 9/048 |
| | | | 211/5 |
| 6,705,822 B2 | 3/2004 | Oldak | |
| 8,733,605 B2 * | 5/2014 | Pedrini | B60R 9/10 |
| | | | 224/488 |
| 9,821,721 B2 * | 11/2017 | Casagrande | B60R 9/08 |
| 2010/0264285 A1 | 10/2010 | Buelna | |
| 2012/0168481 A1 | 7/2012 | Casagrande | |
| 2013/0299667 A1 | 11/2013 | Casagrande | |
| 2014/0076949 A1 * | 3/2014 | Casagrande | B60R 9/08 |
| | | | 224/559 |
| 2016/0025264 A1 * | 1/2016 | Casagrande | F16M 11/14 |
| | | | 248/205.9 |

OTHER PUBLICATIONS

Pushys Review: Sea Sucker Talon Bike Rack. Pushys Online. Mar. 12, 2014 (Mar. 12, 2014) [online], [retrieved on Dec. 16, 2016]. Retrieved from the internet: <URL: https://www.youtube.com/watch?v=VYiqI4ECaJI>.

* cited by examiner

VACUUM MOUNTED CARRIER FOR A VEHICLE

CROSS-REFERENCE TO RELATED APPLICATIONS

This application is the U.S. National Stage under 35 U.S. § 371 of PCT/US2016/051975, filed Sep. 15, 2016, which claims priority to U.S. Provisional Application No. 62/218,940 filed Sep. 15, 2015 entitled VACUUM MOUNTED CARRIER FOR A VEHICLE and which is incorporated herein by reference.

BACKGROUND ART

The present disclosure relates to a system that detachably installs to automotive vehicles for transporting articles without compromising, but instead maintaining the integrity of a mounting surface, and more particularly, to a carrier system that detachably installs to vehicles with a vacuum assembly for transporting articles.

Carriers or racks are commonly used with automotive vehicles to transport various recreational equipment, such as, bicycles, skis, snowboards, surfboards, and the like. Conventional carriers are mounted in one of these locations: to the roof, to the trunk, the rear window, to the truck bed, or to a trailer hitch. To withstand the large forces on the carrier and the supported articles while the vehicle is moving, conventional carriers must securely attach to the vehicle. Either the carrier is permanently attached to the vehicle with fasteners, or removeably attached to the vehicle using brackets, straps, or latches. However, both methods have disadvantages.

Permanently installed carriers can be expensive to purchase and install, and typically require modifications to the vehicle. In addition, they cannot be removed. Detachable carriers are difficult and time-consuming to install and must be repeatedly installed and removed. Also, they are susceptible to damaging the vehicle during installation and use due to the plates and straps applied to the vehicle undertension which causes denting and scratching. If improperly installed, damage can occur to the vehicle and the articles being transported. Typically, conventional racks are designed for use with a specific make and model of vehicle. Therefore, consumers cannot use a single rack for multiple vehicles, at least not without adaptors or modifications. As a result, manufacturers must produce an increased number of parts, and retailers must provide an ever increasingly complex list of parts options lists to consumers, which also increases the cost.

There is a long felt need in the marketplace for a bike rack that is compatible with sports cars and other vehicles that have very limited space available for attachment. For example, convertible vehicles typically only have a small rear trunk area available for attachment. Therefore, a carrier that is easily and reliably installed and removed from a multiple vehicles including vehicles with small attachment footprints is needed that maintains the integrity of a mounting surface.

BRIEF DESCRIPTION OF THE DRAWINGS

In the accompanying drawings which form part of the specification.

Corresponding reference numerals indicate corresponding parts throughout the several figures of the drawings.

BEST MODES FOR CARRYING OUT THE INVENTION

Figure 1:
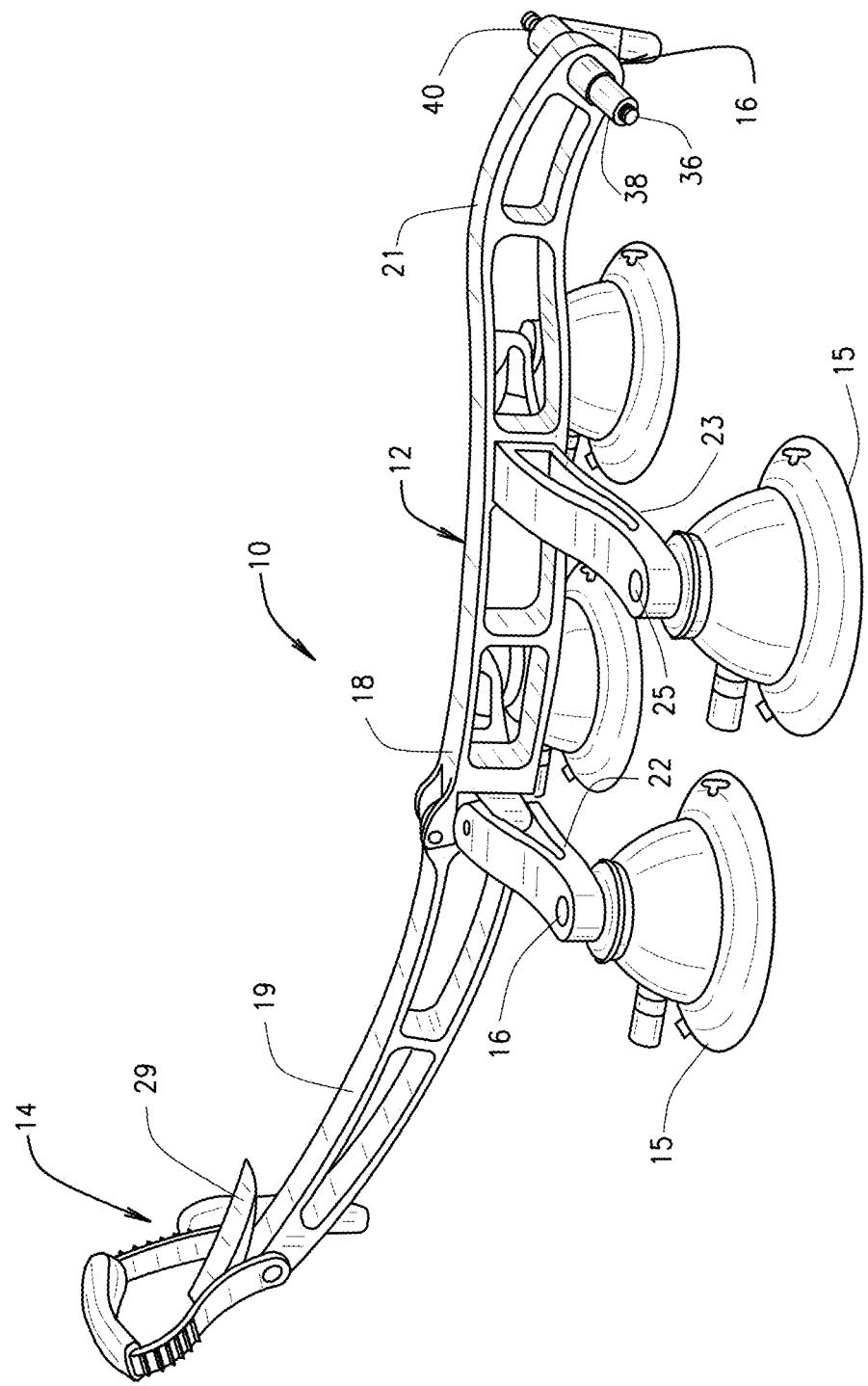
FIG. 1 is a perspective view of a carrier system.
Figure 2:
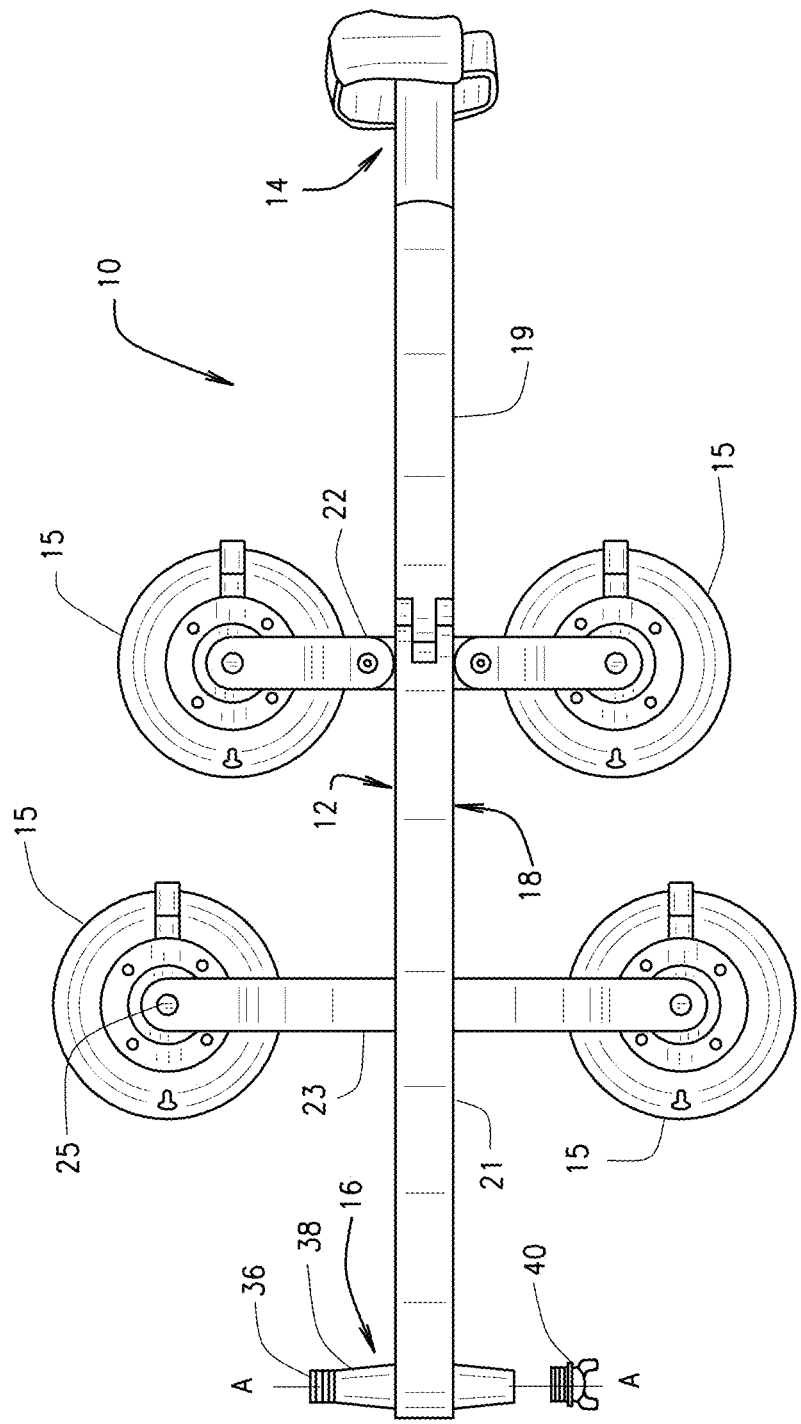
FIG. 2 is an overhead view of the carrier system.

The following detailed description illustrates the claimed invention by way of example and not by way of limitation. The description clearly enables one skilled in the art to make and use the invention, describes several embodiments, adaptations, variations, alternatives, and uses of the invention, including what is presently believed to be the best mode of carrying out the claimed invention. Additionally, it is to be understood that the disclosure is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As shown in FIGS. 1-13, an embodiment of the present disclosure of the invention, generally referred to as a carrier system 10, includes a frame member 12 with first and second mounts 14 and 16 that are sized and shaped to couple with recreational articles, and a plurality of vacuum devices 15 attached to the frame member 12 that can detachably attach to a mounting surface of a vehicle. The carrier system 10 can couple with any recreational article, including, but not limited to, a bicycle, skis, a snowboard, a surfboard, a canoe, or a kayak.

Figure 3:
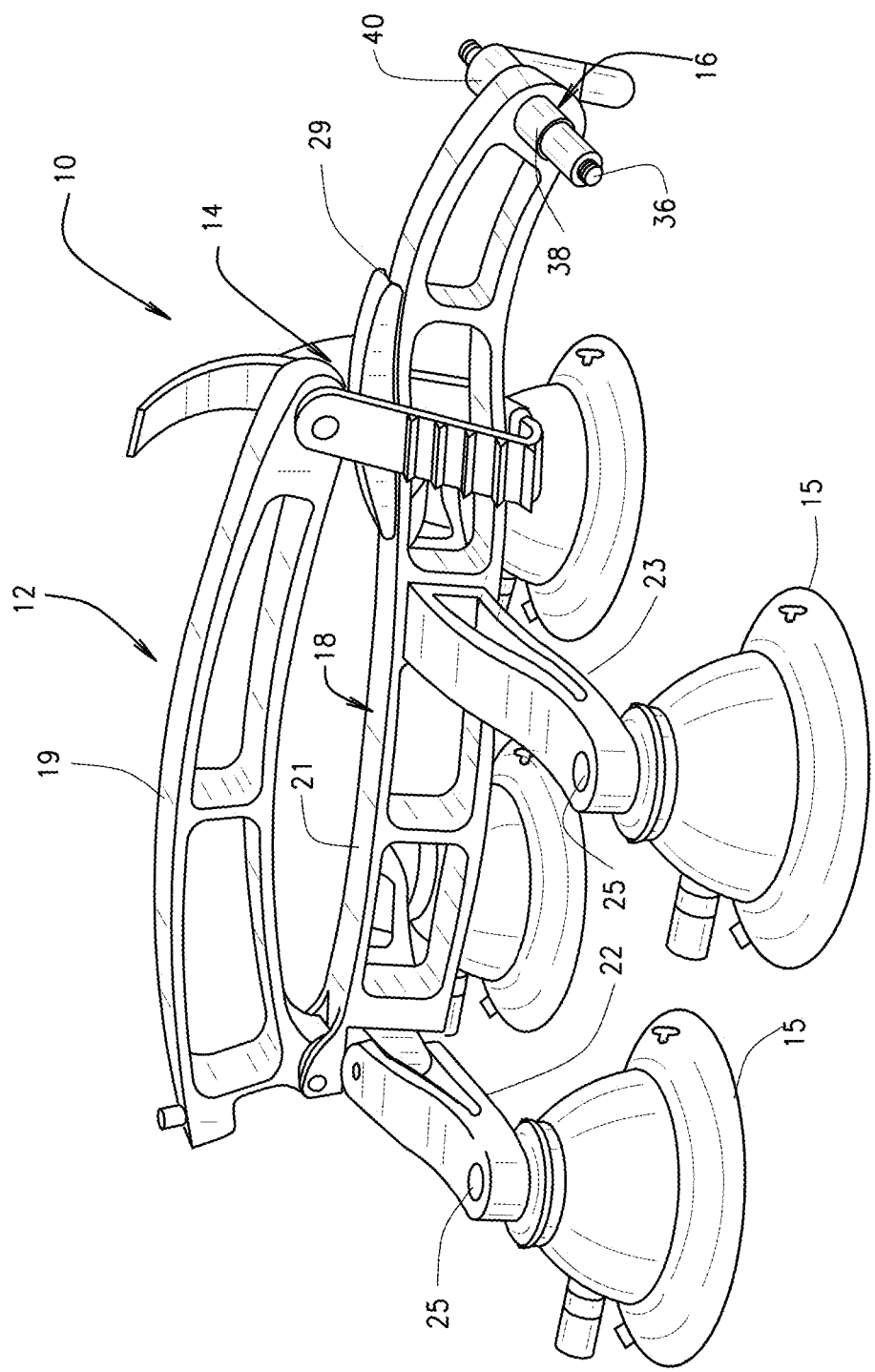
FIG. 3 is a perspective view of the carrier system in a collapsed position.
Figure 4:
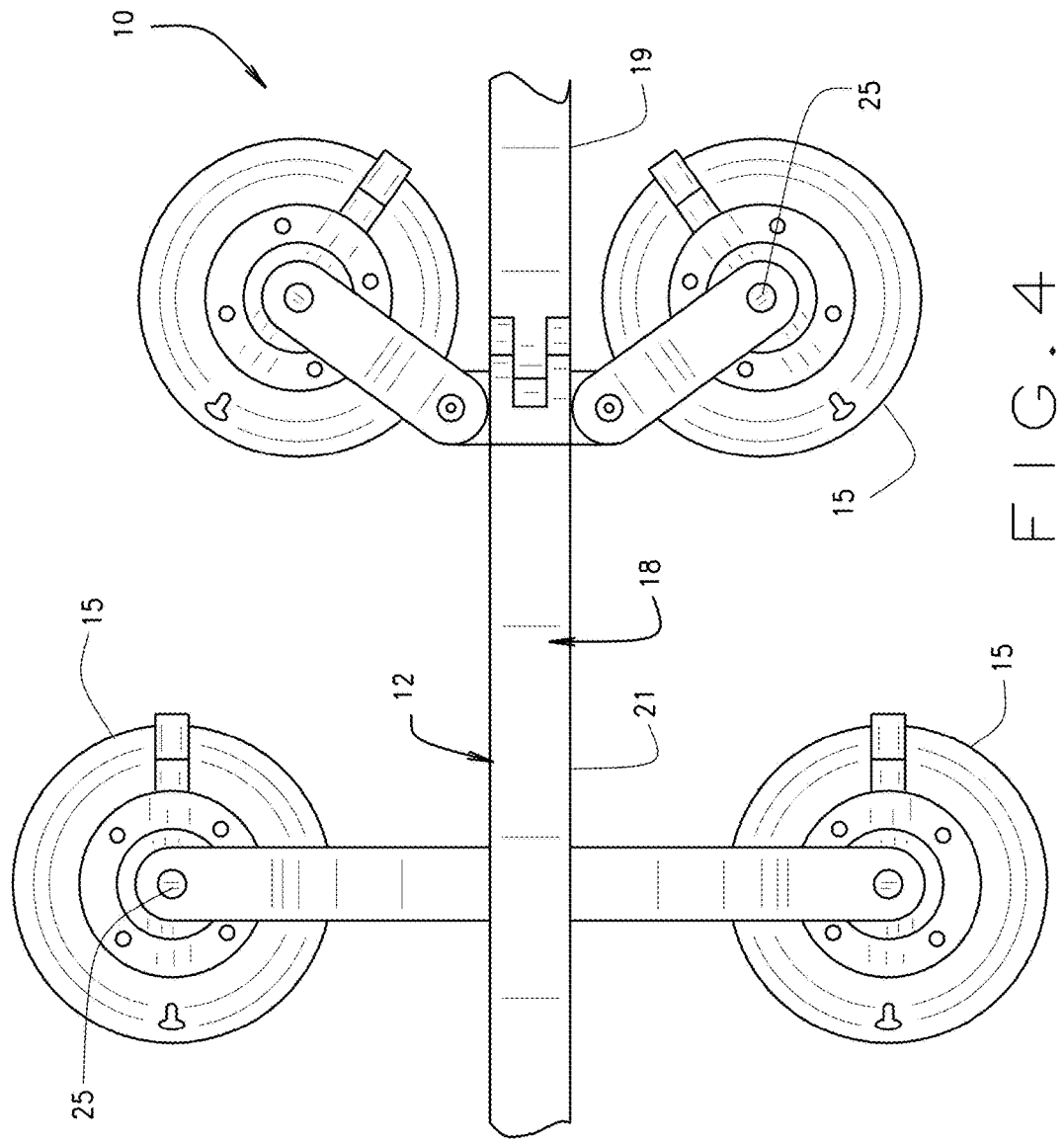
FIG. 4 is an overhead view of the carrier system in an articulated position.

The frame 12 is a generally arcuate support bar 18 with a front member 19 pivotally connected to a rear member 21, such as with fasteners so that the front member 19 can pivot from an operating position (FIG. 1) to a storage position (FIG. 3). The front member 19 of the support bar 18 curves generally upward terminating in the first mount 14, and the rear member 21 curves generally downward terminating with the second mount 16.

A front crossbar 22 and rear crossbar 23 extend generally perpendicularly from the rear member 21 of the support bar 18.

Respective ends of the front crossbar 22 and rear crossbar 23 are each sized and shaped to mate with respective vacuum devices 15, such as with fasteners 25. Those skilled in the art will recognize that the crossbars 22 and 23 can be any shape and size capable of mating with the vacuum device 15. The rear crossbar 23 includes left and right portions that pivotally attach to the support bar 18 to accommodate undulating surfaces such as sharp curves or bumps on the vehicle.

In the embodiment of FIGS. 1-4, the frame 12 mates with four vacuum devices 15, such as with fasteners 25, to provide enough vacuum strength to withstand the tensions, shear, and other forces on the carrier system 10 during operation. Multiple vacuum devices 15 help stabilize the load and provide redundancy should one or more vacuum device 15 fail.

The first mount 14 includes an arcuate support member 29 sized and shaped to receive a bicycle tire and a securement strap to secure the tire to the support member 29. However, the first mount 14 can be configured to secure other portions of the bicycle or other recreational articles. In addition, the first mount can comprise other types of securing devices, such as a bicycle skewer assembly.

The second mount 16 is a skewer assembly 38 sized and shaped to couple with front or rear fork arms 35 of a bicycle. The skewer assembly 38 includes a generally tubular housing that defines a bore along a center axis. (FIG. 1). Generally cylindrical protrusions 24 extend outwardly from each end of the housing along the center axis. The protrusions 24 are shaped and sized to mate with the front clevises 36 of the fork arms 35, which first requires removal of the wheel. To secure the fork arms 35 to the skewer assembly 38, a skewer rod inserts through the bore and is secured with fasteners, such as a nut 38 and a cam clamp 40. The cam clamp 40 can be tightened or loosened to secure and release the fork. Those skilled in the art will recognize that the mount 14 can include any other suitable arrangement that properly secures a recreational article, such as, straps, fasteners, clamps, cables, brackets, tethers, and the like. In addition, the mount 14 can include adaptors that accommodate various fork sizes and models, such as "Fork Up" available from Hurricane Components for 15 mm or 20 mm through-axle models. Also, the rear wheel of the bicycle can be cradled in the rack instead of the front fork so that the front wheel does not need to be removed.

Figure 11:
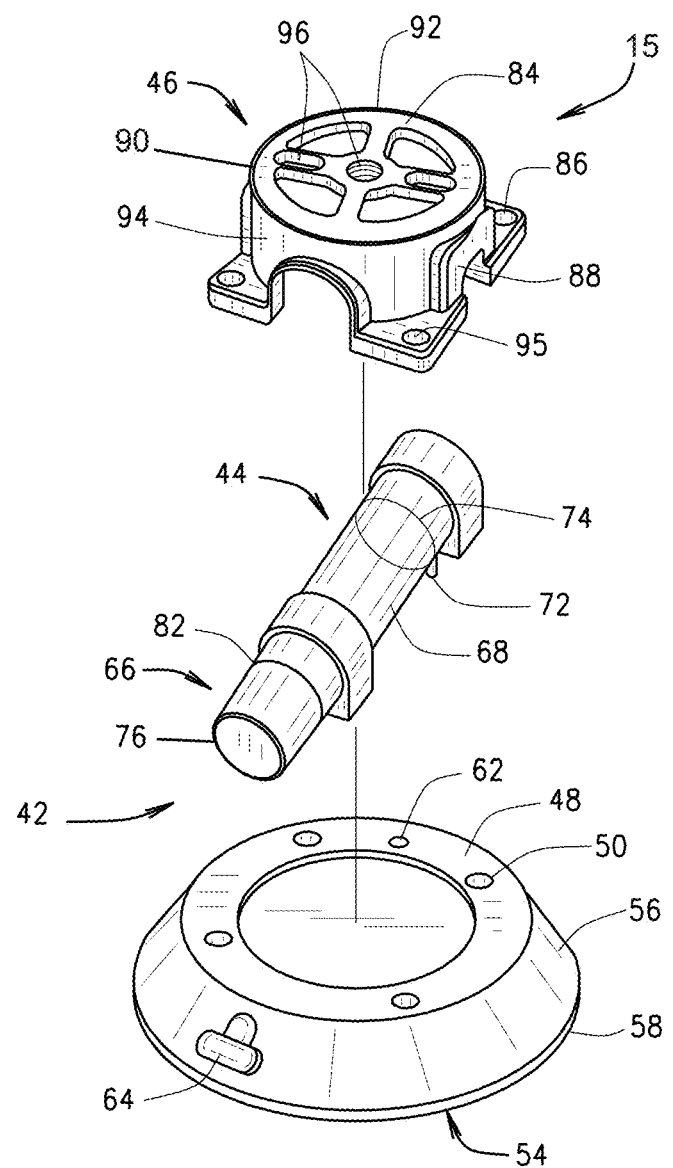
FIG. 11 is an exploded view of a vacuum device.
Figure 12:
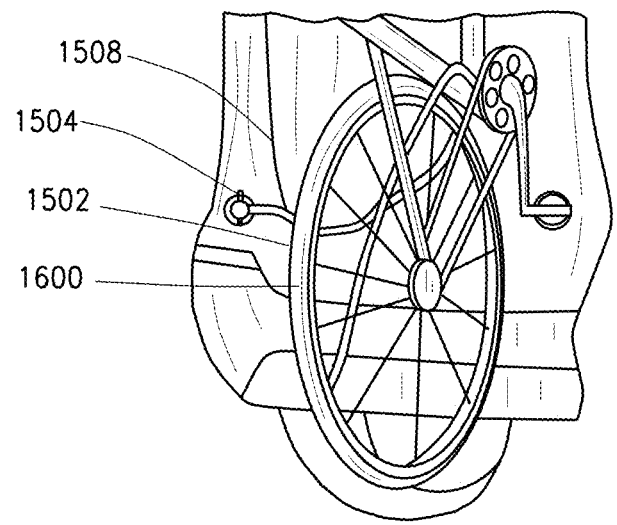
FIG. 12 is a perspective view of a bicycle secured to a vehicle with a locking system.
Figure 13:
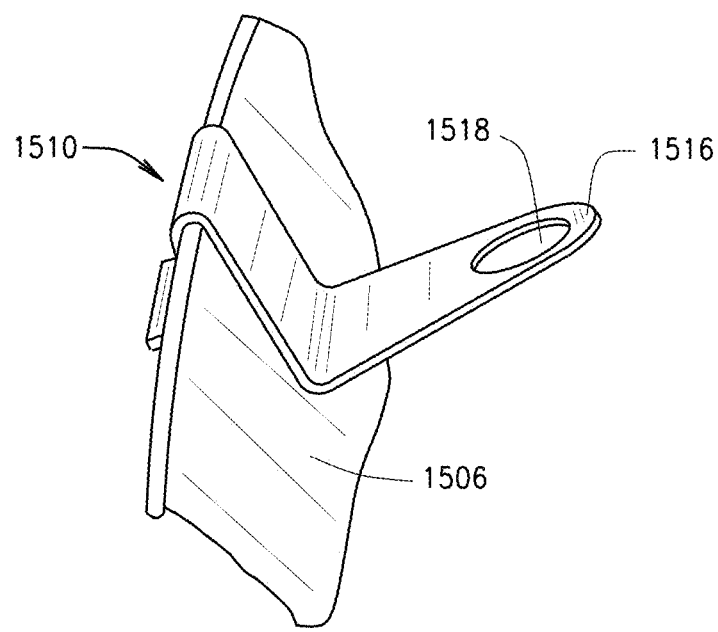
FIG. 13 is a perspective view of the locking clip engaged with a vehicle window.

The vacuum devices 15 are similar to the device disclosed in U.S. patent publication No. 2007/0216154, which is hereby incorporated by reference. Each vacuum device 15 includes a vacuum pad 42 and an attached vacuum pump 44 (FIG. 11). A housing 46 attaches to the vacuum pad 42 to enclose and secure the vacuum pump 44 to the vacuum pad 42. The housing 46 is shaped and sized to enclose the vacuum pump 44 while allowing for the attachment of an accessory and likewise to a surface of a vehicle.

The vacuum pad 42 is generally a conical frustum that defines a top face 48 having threaded holes 50 to mount with the housing 46 using fasteners. The vacuum pad 42 also includes a recessed vacuum face 54 being generally parallel to the top face 48, a sloped side surface 56 extending between the top face 48 and the vacuum face 54, and a generally circumferential seating edge 58 along the perimeter of the vacuum face 54. In this arrangement, the seating edge 58 can seat with the mounting surface of a vehicle to form a vacuum cavity. The vacuum pad 42 defines a channel 62 extending from the top face 48 to the vacuum face 54 and sized to mate with the vacuum pump 44. Release tabs 64 extend outwardly from the side surface 56. The release tabs 64 are generally t-shaped ribs that are shaped and sized to enhance rigidity of the pad 42 and help prevent release of the vacuum device 16 from the mounting surface 17, such as during exposure to warmer temperatures.

Preferably, the pad 42 is made from a flexible material, such as, rubber, or plastic. However, the pad 42 can comprise any material that allows the vacuum pad 42 to seat with the mounting surface. Preferably, the material should not be prone to scuffing the mounting surface during installation or operation. In addition, the material can comprise any suitable color and may include other desirable attributes. For example, the pad 42 can be a reflective or glow-in-the-dark material so that it can be seen in dark environments.

The pump 44 includes a generally cylindrical plunger 66 and a hollow cylinder 68 that defines a chamber sized and shaped to receive the plunger 66. The plunger 66 moves within the chamber between a pressed position and a released position to create the vacuum cavity between the vacuum face 54 and the mounting surface. The cylinder 68 has an opening to the chamber at one end and is closed at the opposite end. A tube 72 extends generally perpendicularly from the closed end of the cylinder 68. The tube 72 is sized and shaped to insert into the channel 62 of the vacuum pad 42 to provide fluid communication between the cylinder chamber and the vacuum cavity. The plunger 66 is sized to insert into the cylinder 68 with a sliding fit that allows the plunger 66 to move back and forth within the cylinder 68. A check valve 74 is positioned within the cylinder chamber in communication with the chamber and the tube 72 so that fluids and gases can only transfer into the tube 72 from outside of the cylinder 68. This allows the vacuum device 15 to be re-pumped without loss of remaining vacuum. In an alternate embodiment, an automatic pump can be used to increase the vacuum level of the vacuum device if it falls below a pre-determined level. In another alternate embodiment, a vacuum device includes a signaling component capable of indicating or sending a signal that indicates a loss of a designated amount of pressure, including, but not limited to, an audio signal, a visual signal, an electronic signal, or a wireless or Bluetooth® signal. For instance, a signaling component can send a wireless signal to a wireless phone and, in conjunction with appropriate software on the phone, indicate the vacuum pressure.

The plunger 66 is generally a rod with a push button 76 at one end, a seal at the opposite end, and a biasing member therebetween. The seal is sized and shaped to seat against the inner wall of the cylinder 68. When the plunger 66 inserts into the cylinder chamber, the biasing member biases the plunger 66 to the released position. The position of the plunger 66 in the released position will vary respective to the amount of vacuum pressure within the vacuum cavity.

An indicator 82 positioned about the lower portion of the push button 76 indicates to the operator the relative amount of vacuum pressure within the vacuum cavity. The indicator 82 is a colored ring or sleeve sized and shaped to attach around the lower portion of the push button 76. The indicator 82 can be red, yellow or any color that is easily seen. Additionally, the indicator 82 can be a reflective or glow-in-the-dark material so that it can be seen in dark atmospheres and under water. When no vacuum pressure exists in the vacuum cavity, the biasing member extends the plunger 66 to its most extended release position. In this position, the indicator 82 is fully visible. As the pressure increases in the vacuum cavity, the force of the vacuum lessens the bias of the biasing member, and, in turn, the plunger 66 extends less from the chamber and less of the indicator 82 is visible.

The housing 46 is a generally cylindrical member with a generally rectangular base which includes a top surface 84, bottom surface 86, first side 88, second side 90, third side 92, and pump side 94 (FIG. 11). The bottom surface 86 of the housing 46 defines housing apertures 96 for attachment to the vacuum pad 42 with fasteners. The top surface 84 defines attachment apertures for attachment of accessories with appropriate means, such as fasteners, straps, and other suitable members. Although, housing apertures 96 and attachment apertures are shown on top side 84 of housing 46, those skilled in the art will recognize that housing apertures 96 and attachment apertures can be located on any side 88, 90, 92, 94 of the housing 46. Also, the housing apertures 96 and attachment apertures can be holes, slots, or any other configuration sized and shaped to accommodate different dimensions of various manufacturers' accessories. The housing 46 can be made from a variety of materials, including marine grade stainless steel, powder-coated aluminum, rubber or plastic.

In operation, an operator places the vacuum face 54 of pad 42 against a mounting surface of a vehicle, which creates a vacuum cavity between the vacuum face 54 of the pad 42 and mounting surface. This embodiment is preferably used with a pick-up truck, with the mounting surface comprising the rear window of the truck. The operator repeatedly pushes the plunger 44 from the released position to the pressed position to remove fluid (air, gas, and/or water) from the vacuum cavity, thereby, reducing the pressure below the pressure of the surrounding atmospheric pressure. This creates a vacuum such that edge 58 and vacuum face 54 of pad 42 seat against the mounting surface. A vacuum exists whenever the pressure within the space is less than the pressure that surrounds it. To obtain an adequate vacuum for operation, the operator should repeatedly press the plunger 66 until the indicator 82 is no longer visible when the plunger 66 is in the released position. If at any time during operation the indicator 82 becomes visible indicating a loss of vacuum, the operator can again repeatedly push the plunger 66 until the indicator 82 is no longer visible.

Figure 5:
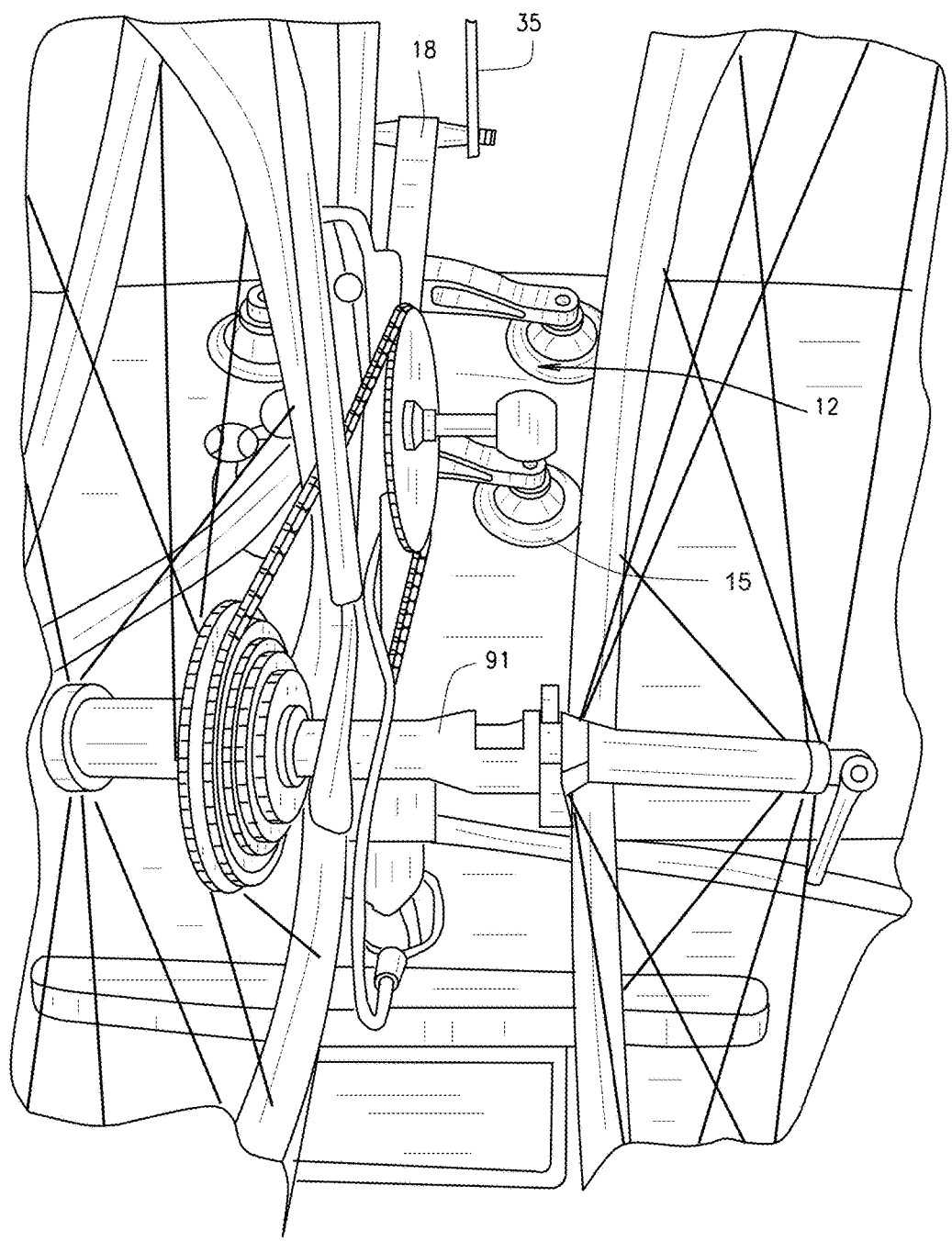
FIG. 5 is a is a rear perspective view of the carrier system mounted to a vehicle.
Figure 6:
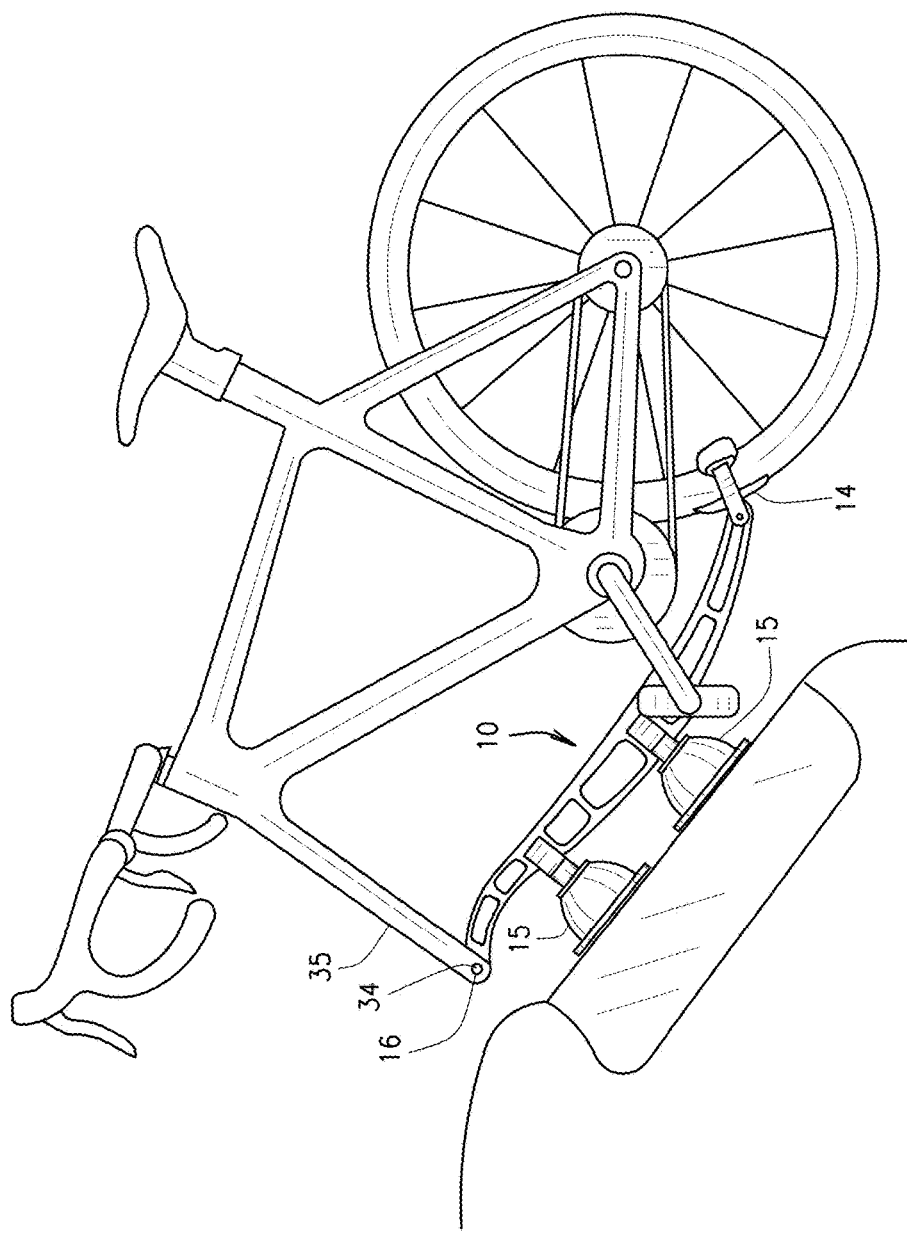
FIG. 6 is a perspective view of the carrier system mounted to the vehicle.
Figure 7:
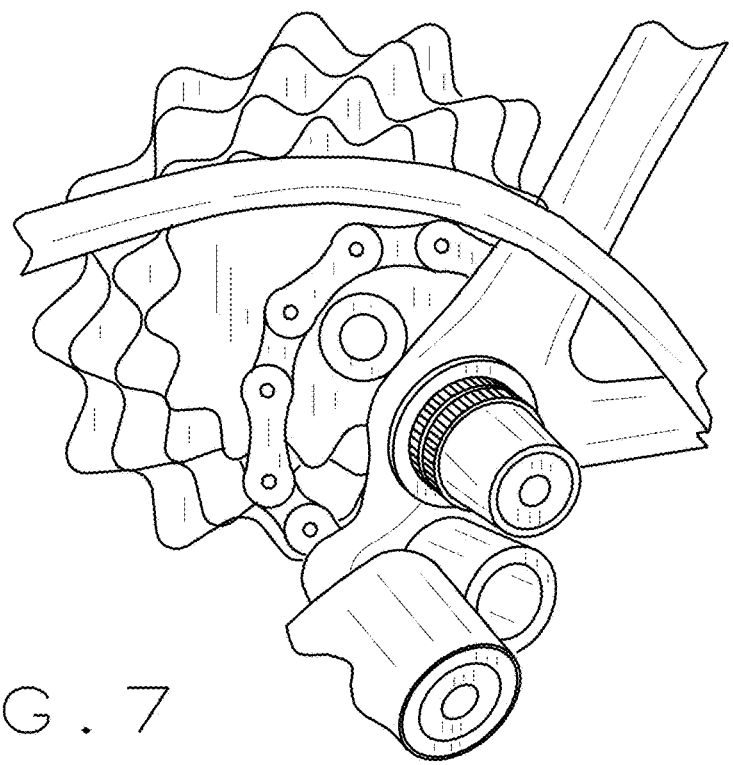
FIG. 7 is a perspective view of a rear fork.
Figure 8:
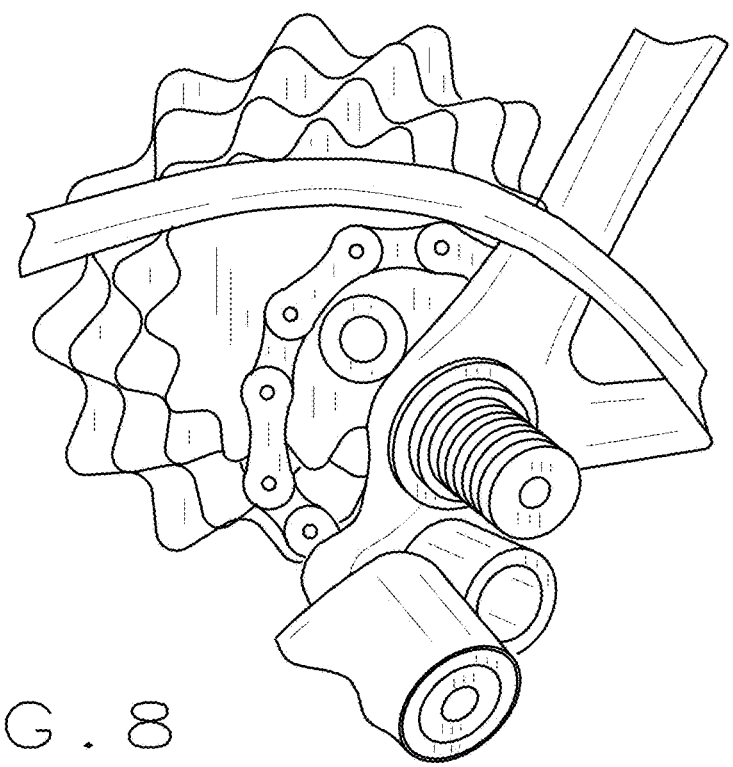
FIG. 8 is a perspective view of a rear fork with end cap removed.

Once the carrier system 10 is attached to a mounting surface of a vehicle, a recreational device, such as a bicycle can be attached to the mount 14. In FIG. 5, the clevises of the fork arms 35 mate with the protrusions 24 and are secured by inserting and tightening a skewer rod 36 (See FIGS. 1-3). In this position, the rear bicycle wheel rests on the truck bed. When desired, the skewer rod 36 is loosened and the bicycle can be removed.

To release the vacuum and remove the carrier system 10, the operator lifts the release tabs 64 on the side face 56 of pad 42 away from the mounting surface. In other embodiments, a valve stem can be activated to release the vacuum device 15. Additionally, a twist button with a course thread located on the top face of the pad 42 can be used to release the vacuum device 15.

Figure 9:
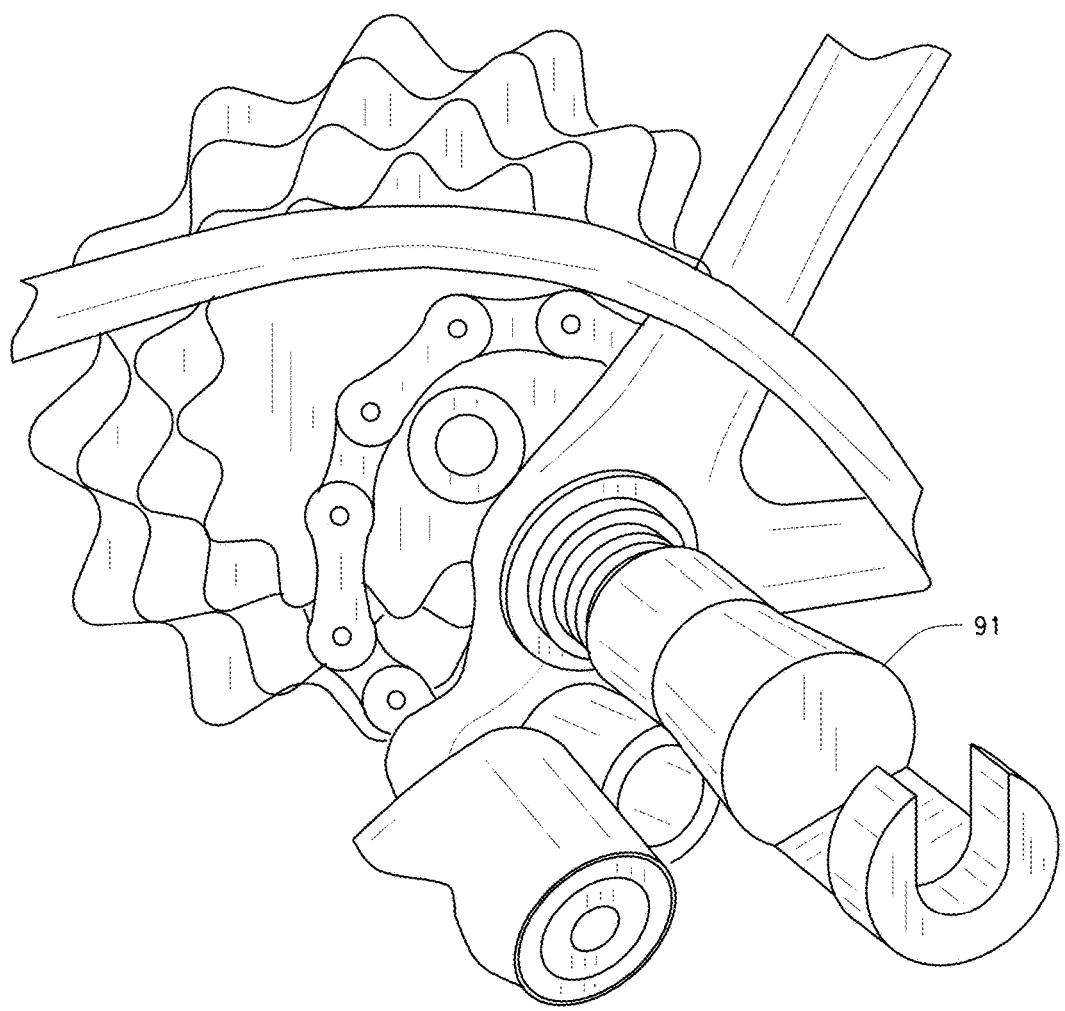
FIG. 9 is a perspective view of a rear fork with rear wheel mount.
Figure 10:
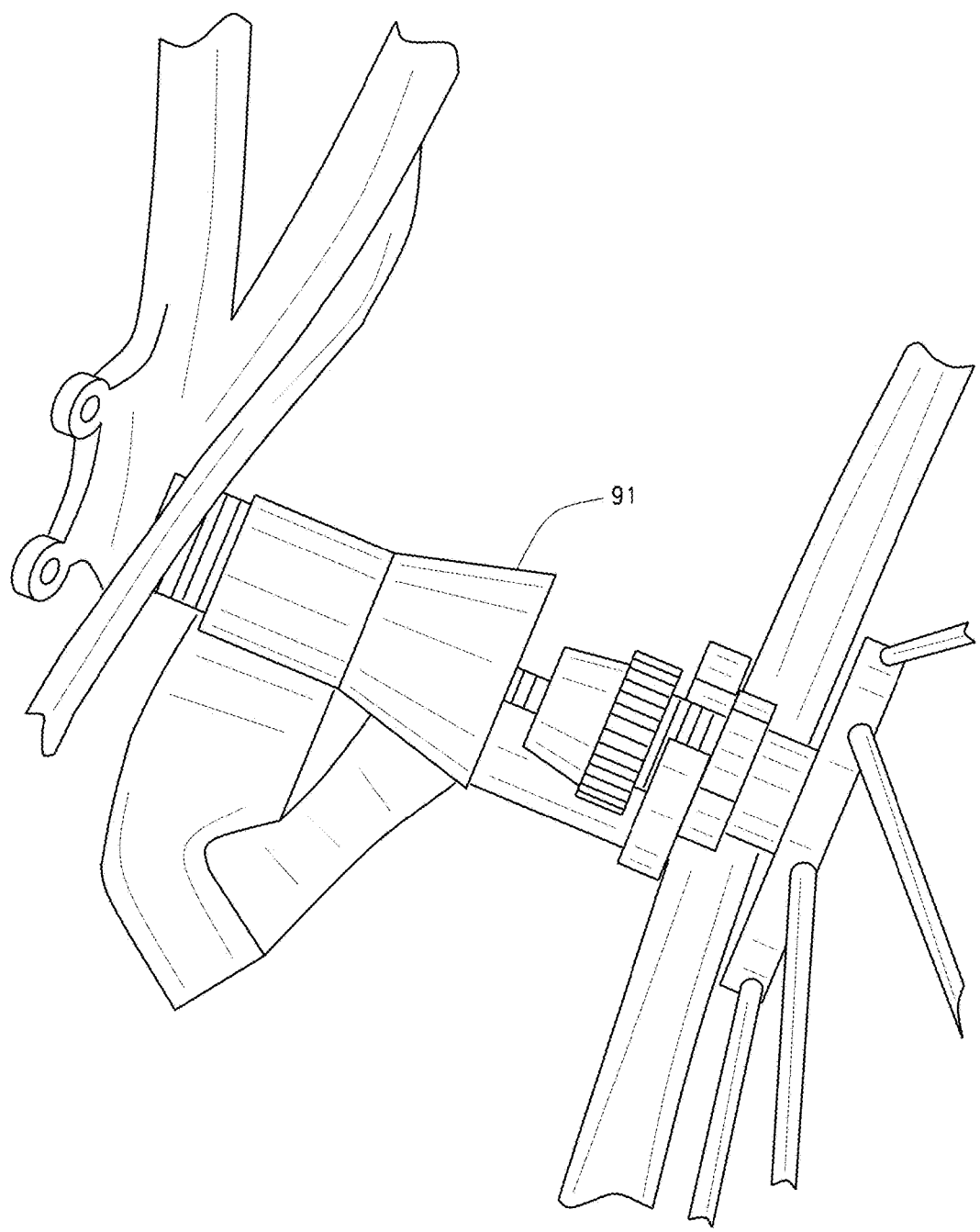
FIG. 10 is a perspective view of a rear fork with a rear wheel coupled to the rear wheel mount.

As shown in FIGS. 5, 9 and 10, the carrier system 10 can also include a rear wheel mount 91 for securing the rear wheel of a bicycle while the front of the bicycle is secured to the mount 14. The rear wheel mount 91 is generally a cylindrical member having a first attachment portion that couples with a spindle of the rear wheel, such as with an internally threaded portion, and a second attachment portion that couples with a spindle of the front wheel. The second attachment portion is generally a slotted disc that is configured to correspond to the front fork of the bike.

If desired, an attachment member, such as a tether, rope, cord, cable, or other member, along with a lock 1502, can attach between the frame 12 and the vehicle, preferably with a security clip 1504, which is described in more detail below. When secured to the vehicle, the attachment member acts as a theft deterrent. Preferably, the frame 12 is constructed from a material capable of handling the loads and tensions occurring during operation of the carrier system, such as metal, fiberglass, plastic, or other suitable materials.

In all of the embodiments, the frames are preferably made from a lightweight metal, such as aluminum. However, any suitable material can be used, including, but not limited to, steel, plastic, or composite material. Alternatively, the frame can be composed of a flexible material, such as Starboard® polymer material or other plastic.

Changes can be made in the above constructions without departing from the scope of the disclosure, it is intended that all matter 10 contained in the above description or shown in the accompanying drawings shall be interpreted as illustrative and not in a limiting sense.

The invention claimed is:

1. A carrier system for a vehicle, comprising:
a frame along the carrier systems longitudinal axis shaped and sized to mate and secure a recreational article;
a plurality of vacuum devices having a pad shaped and sized to removably seat with a vehicle to form a vacuum cavity, a plunger attached to the pad and in fluid communication with the vacuum cavity, and an indicator positioned on the plunger to indicate the level of vacuum pressure within the vacuum cavity; and
the frame having at least first and second mounts sized and shaped to couple with recreational articles, the plurality of vacuum devices being attached to the frame and configured to detachably attach to a mounting surface of a vehicle, the frame being arcuate and further comprising a front frame member pivotally connected to a rear frame member so as to pivot between an operating position and a storage position, wherein the front frame member curves upwardly terminating approximately at the first mount and the rear frame member curves downwardly terminating approximately at the second mount.

2. A carrier system as set forth in claim 1, wherein the system further comprises a front crossbar and a rear crossbar each extending from the rear frame member, the crossbars having respective ends sized and shaped to mate with two or more of the plurality of vacuum devices, the rear crossbar comprising left and right portions that pivotally attach to the rear frame member to accommodate undulating surfaces on the vehicle.

3. A carrier system as set forth in claim 1, wherein the first mount includes an arcuate support member sized and shaped to receive a first bicycle tire and the second mount includes a skewer assembly sized and shaped to couple with front or rear fork arms of a bicycle.

4. A carrier system as set forth in claim 3, wherein the arcuate support member has an attachment portion adapted to couple with the first bicycle tire, and wherein the carrier system further includes a second attachment portion being adapted to couple the first bicycle tire with a second bicycle tire.

5. The carrier system of claim 1 wherein the front frame member pivots snugly atop or under in abutment with the rear frame member when in the storage position.

6. The carrier system of claim 1 wherein a securement apparatus is attached to the frame and is configured to wrap around and secure the front frame member to the rear frame member when the front frame member and the rear frame member are in the storage position.

7. A carrier system for a vehicle, comprising:
a frame shaped and sized to mate and secure a recreational article;

a plurality of vacuum devices having a pad shaped and sized to removably seat with a vehicle to form a vacuum cavity; and the frame having at least first and second mounts sized and shaped to couple with recreational articles, the plurality of vacuum devices being attached to the frame and configured to detachably attach to a mounting surface of a vehicle, the frame being arcuate and further comprising a front frame member pivotally connected to a rear frame member so as to pivot between an operating position and a storage position, wherein the system further comprises a front crossbar and a rear crossbar, the front and rear crossbars extending from the rear frame member, the crossbars having respective ends sized and shaped to mate with two or more of the plurality of vacuum devices, the rear crossbar comprising left and right portions that pivotally attach to the rear frame member to accommodate undulating surfaces on the vehicle.

8. The carrier system of claim 7 wherein a securement apparatus is attached to the frame and is configured to wrap around and secure the front frame member to the rear frame member when the front frame member and the rear frame member are in the storage position.

9. A carrier system as set forth in claim 7, wherein the first mount includes an arcuate support member sized and shaped to receive a first bicycle tire and the second mount includes a skewer assembly sized and shaped to couple with front or rear fork arms of a bicycle.

10. A carrier system as set forth in claim 9, wherein the arcuate support member has a first attachment portion and a second attachment portion, the first attachment portion being adapted to couple with the first bicycle tire and the second attachment portion being adapted to couple with a second bicycle tire without interfering with the attachment and positioning of the first bicycle tire.

11. The carrier system of claim 7 wherein the front frame member pivots snugly atop or under the rear frame member when in the storage position.

12. The carrier system of claim 11 wherein a securement apparatus is attached to the frame and is configured to wrap around and secure the front frame member to the rear frame member when the front frame member and the rear frame member are in the storage position.

* * * * *